United States Patent [19]

Bartmann

[11] Patent Number: 4,719,283

[45] Date of Patent: Jan. 12, 1988

[54] PREPARATION OF POLYIMIDE FROM BIS-IMIDE AND BENZOCYCLOBUTENE

[75] Inventor: Martin Bartmann, Recklinghausen, Fed. Rep. of Germany

[73] Assignee: Huels Aktiengesellschaft, Marl, Fed. Rep. of Germany

[21] Appl. No.: 836,877

[22] Filed: Mar. 6, 1986

[30] Foreign Application Priority Data

Mar. 6, 1985 [DE] Fed. Rep. of Germany ....... 3507879

[51] Int. Cl.[4] ...................... C08G 69/00; C08G 73/12
[52] U.S. Cl. .................................. 528/322; 528/170; 528/220; 528/312; 528/313; 528/315; 528/317; 528/321
[58] Field of Search .............. 528/322, 313, 315, 317, 528/312, 321, 220, 170

[56] References Cited

PUBLICATIONS

Klundt, Irwin L., "Benzocyclobutene and its Derivatives", Chemical Reviews, 1970, vol. 70, No. 4, pp. 471–487.

Oppolzer, Von Wolfgang, "Intramolekulare[4+2]-under[3+2]-Cycloadditionen in der Organischen Synthese", Angew. Chem. 89:10-24, (1977).

Primary Examiner—Harold D. Anderson
Attorney, Agent, or Firm—Millen & White

[57] ABSTRACT

The invention relates to polyimides of the general formula

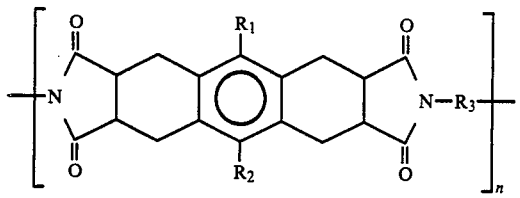

wherein
$R_1$, $R_2$=H, $C_{1-3}$-alkyl, halogen,
$R_3$=$C_{2-12}$-alkylene or

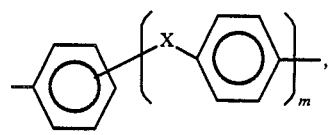

m=0, 1,
X=$CH_2$, $C(CH_3)_2$, CO, O, S, $SO_2$, and
n=5 to 500, as well as a process for their production by reaction of N,N'-bis-maleic acid imides of Formula

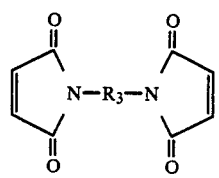

with benzodicyclobutenes of Formula

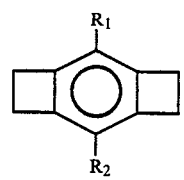

18 Claims, No Drawings

PREPARATION OF POLYIMIDE FROM BIS-IMIDE AND BENZOCYCLOBUTENE

BACKGROUND OF THE INVENTION

The present invention relates to novel, strictly linear polyimides and a process for their production.

Polyimides are usually obtained by reacting either
(a) tetracarboxylic acid dianhydrides with diamines,
(b) tetracarboxylic acid dianhydrides with diisocyanates, and
(c) difunctional cyclic dienes with N,N'-bis-maleic acid imides.

The reaction of tetracarboxylic acid dianhydrides with diamines (cf. U.S. Pat. Nos. 3,677,921; 4,094,862; 4,282,461; 4,063,345 and German Pat. Nos. 1,946,925 and 1,947,029) is a two-stage process. In the first stage, polyamide carboxylic acids are produced which, in a second stage, are reacted at high temperatures to form polyimides. One disadvantage encountered in this process is the occurrence of crosslinking in the second stage imide formation, and the resulting cross-linked polyimides can not be processed by thermoplastic methods.

Ways to solve this problem are set forth in U.S. Pat. Nos. 3,905,442; 3,983,093; 3,968,083; 3,991,004; German Pat. Nos. 2,261,715; 2,202,102; 2,363,785; 2,416,595; 2,441,101; and DOS No. 3,200,633; however, these processes, though avoiding this drawback, require special monomers and/or catalysts that can only be produced at great cost.

In the reaction of tetracarboxylic acid dianhydrides with diisocyanates, as disclosed in U.S. Pat. Nos. 3,787,367 and 3,870,677 and in *J. Polym. Sci. Polym. Chem. Ed.*, 18: 1905-1909 (1980), non-crosslinked and processable polyimides are obtained in one stage, but one disadvantage of the process is the use of diisocyanates which must usually be prepared from the diamines utilized in the first process above, involving an additional reaction step requiring the use of toxic phosgene.

Linear polyimides may also be obtained in a reaction of N,N'-bis-maleic acid imides with bis-dienes [cf. U.S. Pat. No. 3,344,071, *Macromol. Symp.* 28: 611 (1982), *Eur. Polym. J.* 13: 179 (1977), *J. Polym. Sci. Polym. Chem. Ed.* 11: 2143 (1973), and *Vysokomol. Soedin*, Ser. A 18: 926 (1976) all of which disclosures are incorporated by reference herewith], or with dienes with cheletropic groups (German Pat. Nos. 1,100,291; 1,124,690; and 1,145,797 which disclosures are incorporated by reference herewith). A fundamental drawback in this reaction is the fact that such "poly-Diels-Alder reactions" are reversible at an elevated temperature.

Consequently, the polyimides produced according to the state of the art are either crosslinked, thermally unstable or manufacturable only at great cost.

SUMMARY OF THE INVENTION

It is an object of the invention to provide polyimides that are not crosslinked, are thermally stable and can be manufactured economically, and do not suffer from other disadvantages of the prior art.

It is a further object to provide a process for the production of such polyimides.

Upon further study of the specification and appended claims, further objects and advantages of this invention will become apparent to those skilled in the art.

These objects have been met by providing polyimides obtainable by condensation of N,N'-bis-maleic acid imides of Formula (I)

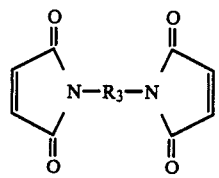

with benzodicyclobutenes of Formula (II)

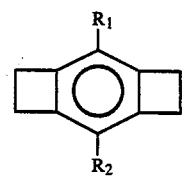

wherein $R_1$ and $R_2$ are each independently an alkyl group of up to 3 carbon atoms (methyl, ethyl, n- or i-propyl), hydrogen, or a halogen (Cl, Br, I, F); and $R_3$ is a $C_{2-12}$-alkylene group (straight-chained or branched) or a group having the structure

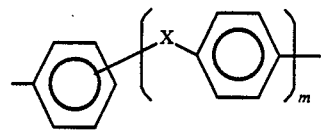

wherein $m=0$ or 1 and $X=CH_2$, $C(CH_3)_2$, CO, O, S, or $SO_2$ and the molar ratio of I to II, x, is $1.1 > x \geq 1$, preferably $1.05 > x \geq 1$.

The objects have further been met by providing polyimides of the Formula

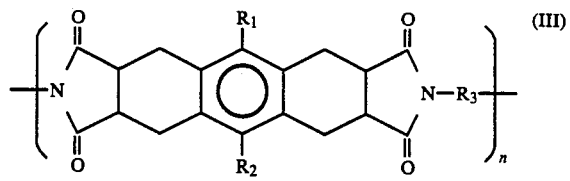

wherein $R_1$, $R_2$ and $R_3$ are as defined above and n is an integer of 5 to 500.

DETAILED DISCUSSION

The reaction behavior of the benzodicyclobutenes is surprising. Benzocyclobutenes are known to have diene reactivity [see I. L. Klundt, *Chem. Rev.* 70, 471 (1970) and W. Oppholzer, *Angew. Chem.* 89:10-24 (1977), which disclosure is incorporated herewith] but in the case of the benzodicyclobutenes, the reactive diene form (a) is in mesomerism with resonance structures, such as (b) and (c) which have a free radical character and therefore would be expected to react in an entirely different fashion, undergoing side-reactions and producing poor yields of desired polyimides.

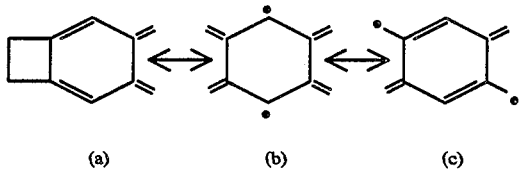

(a)    (b)    (c)

However, the expected troublesome free radical secondary reactions are surprisingly not encountered to any appreciable extent. Thus, the selectivity of this reaction is surprisingly high, e.g., 70–99 mole%. It is likewise surprising and extremely advantageous that the resultant Diels-Alder products are thermally stable, unlike the products produced by reactions according to the state of the art.

The N,N'-bis-maleic acid imides of Formula I suitable in accordance with this invention are preferably prepared from maleic anhydride and a diamine corresponding to $R_3$, e.g., according to U.S. Pat. No. 2,444,536, which disclosure is incorporated herewith. Imides produced in any other way are also suitable according to this invention. Preferred bis-maleic acid imides according to Formula I include:

p-phenylene-bis-maleic acid imide
m-phenylene-bis-maleic acid imide
4,4'-bis-maleic acid imidodiphenylmethane
4,4'-bis-maleic acid imidodiphenyl ether
4,4'-bis-maleic acid imidodiphenylsulfone
4,4'-bis-maleic acid imidobenzophenone
1,2-bis-maleic acid imidobutane
1,6-bis-maleic acid imido-2,2,4- and/or -2,4,4-trimethylhexane
1,6-bis-maleic acid imidohexane
1,12-bis-maleic acid imidododecane
2-methyl-1,5-bis-maleic acid imidopentane
2-ethyl-1,4-bis-maleic acid imidobutane.

Imides wherein $R_3$ is a difunctional aromatic residue are preferred. It is also possible to employ mixtures of various imides, e.g., in non-critical proportions, e.g., of 0.1 to 99.9% of each.

In the benzodicyclobutenes of Formula II, $R_1$ and $R_2$ are preferably identical and are preferably hydrogen or methyl. The following benzocyclobutenes are most preferred:

benzo(1,2:4,5)dicyclobutene
3,6-dimethylbenzo(1,2:4,5)dicyclobutene
3,6-dibromobenzo(1,2;4,5)dicyclobutene.

The benzodicyclobutenes of Formula II can be produced according to *J. Am. Chem. Soc.* 100:2892 (1978); *J. Org. Chem.* 46:4608 (1981); *J. Am. Soc.* 82:2524 (1960); and *Tetrah. Let.* 46:4569 (1978), which disclosures are incorporated by reference herewith.

The production of the polyimides is preferably performed using approximately equimolar amounts of starting materials in aprotic solvents. Preferably, the reaction is conducted in solution based on practical considerations. Preferred solvents are inert with respect to the monomers as well as with respect to the reaction product. In addition, the monomers and the thus-formed polymers are at least extensively soluble in the solvent. Preferred solvents are dipolar aprotic or halogenated organic compounds, especially those with boiling points above 100° C. Especially preferred are sulfolane (tetrahydrothiophene dioxide), dimethyl sulfoxide, diphenylsulfone, chloronaphthalene, dichlorobenzene, nitrobenzene, or diphenyl ether. Mixtures of these solvents can also be employed. Solvents having a boiling point below 100° C., e.g., chloroform or dichloromethane, can be utilized if the pressure in the system is increased over atmospheric pressure a sufficient amount to prevent appreciable amounts of solvents from evaporating, e.g., 1–10 bar.

The preferred concentration range of monomers in solvent is between 1 and 30% by weight of monomers, based on the sum total of monomers and solvent. The reaction is preferably conducted at a temperature of more than 100° C., more preferably 170° to 250° C., for time 0,1–10 hours. Preferably, a protective atmosphere (Ar, $N_2$, etc.) is used.

It is also preferred to conduct the polymer forming reaction under conditions preventing free radical polymerization of the bis-maleic acid imides. To prevent radical polymerization, small amounts (e.g., 0,1–5 wt.% based on the amount of I) of stabilizers based on sterically hindered phenols or hydroquinones can be added, for example, 2,6-di-tert.-butyl-p-cresol, IRGANOX 1010, 1076, 1098 (sol d by Ciba Geigy) or hydrochinone.

When conducting the process in the absence of stabilizers, preferably 0.8–1 mole of bis-maleic acid imide is added, for 1 mole of benzodicyclobutene.

When working in the presence of stabilizers, about 0.8–1.2 moles of bis-maleic acid imide is preferably utilized, again based on 1 mole of benzodicyclobutene. The imide may be added all at once, or in increments.

The polyimides thus-formed exhibit the general Formula (III)

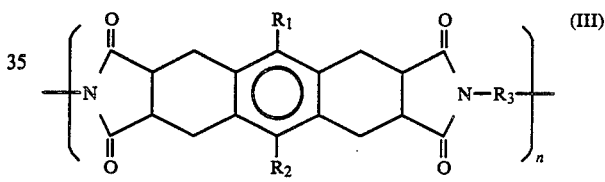

wherein n=5–500 and $R_1$, $R_2$ and $R_3$ are as defined above. The terminal group of the resultant polyimides is the group

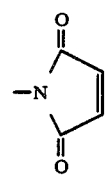

By using a relatively large quantity of benzodicyclobutene, i.e., 1,01–1,2 moles per mole of imide, it is also possible to obtain terminal groups having the formula

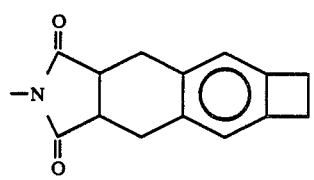

The thus-produced polyimides are strictly linear and thermally stable up to at least 350° C. They can be processed by thermoplastic methods into molded parts having a high heat deflection temperature under load, in the presence of the usual additives, such as, for example, stabilizers, pigments and processing aids, and optionally in mixtures with other polymers.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight, unless otherwise indicated.

EXAMPLE 1

A solution of 4.4 g of 4,4'-bis-maleic acid imidodiphenylmethane, 1.6 g of benzo(1,2:4,5)dicyclobutene, and 0.01 g of hydroquinone in 50 ml of sulfolane, prepared at room temperature, is stirred in a nitrogen atmosphere for 6 hours at 210° C. After cooling, a viscous solution is obtained from which the thus-formed polyimide is precipitated by pouring 100 ml of methanol into the reaction mixture. The white, pulverulent product is suctioned off and washed with methanol and subsequently dried at 100° C. under an oil pump vacuum for 10 hours.

Yield: 5.7 g (95%)

J-Value: 92 ml/g (measured in a 1% solution in N-methylpyrrolidone at 25° C.).

IR Spectrum: 1,780 cm$^{-1}$ and 1,729 cm$^{-1}$ (typical imide signal), 1520 cm$^{-1}$, 1,380 cm$^{-1}$, 1,170 cm$^{-1}$.

The out-of-plane vibration of the double bonds of the bis-maleic acid imide utilized at 690 cm$^{-1}$ could no longer be perceived in the product. The product, as per thermo-gravimetric analysis, is stable up to 400° C. ($N_2$). Weight loss is smaller than 5%.

EXAMPLE 2

Analogously to Example 1, a solution was prepared from 4.4 g of 4,4'-bis-maleic acid imidodiphenylmethane, 1,.9 g of 3,6-dimethylbenzo(1,2:4,5)dicyclobutene, and 0.01 g of 2,6-di-tert-butyl-4-methylphenol in a solvent mixture of 25 ml of sulfolane and 25 ml of diphenyl ether, and reacted at 230° C.

Yield: 5.8 g (93%).

$\underline{M_w}$: about 90,000 (as per GPC analysis in hexafluoroisopropanol).

IR Spectrum: except for minor differences in the fingerprint zone, there are no differences with respect to the spectrum of the product from Example 1.

The product is stable up to 400° C. ($N_2$) as per thermo-gravimetric analysis. Weight loss is below 5%. Decomposition occurs at temperatures of above 450° C.

EXAMPLE 3

Analogously to Example 1, a solution was prepared from 2.2 g of p-phenylene-bis-maleic acid imide, 1.56 g of 3,6-dimethylbenzo(1,2:4,5)dicyclobutene, and 0.01 g of 2,6-di-tert-butyl-4-methylphenol in 50 ml of sulfolane, and reacted at 230° C.

Yield: 3.45 g (92%).

J-Value: 58 ml/g (measured in a 1% solution in N-methylpyrrolidone at 25° C. corresponding to DIN 53 728).

IR Spectrum: 1,780 cm$^{-1}$ and 1,710 cm$^{-1}$ (imide signals), 1.510 cm$^{-1}$, 1,370 cm$^{-1}$, 1,170 cm$^{-1}$.

EXAMPLE 4

Over a time period of 4 hours, a solution of 3.58 g (10 mmol) of 4,4'-bis-maleic acid imidodiphenylmethane in 25 ml of sulfolane is added dropwise in portions to a solution of 1.60 g (10.1 mmol) of 3,6-dimethylbenzo(1,2:4,5)dicyclobutene in 25 ml of sulfolane, stirred under nitrogen at 220° C. The mixture is maintained for 3 hours at this temperature, cooled, and the product isolated by pouring into 100 ml of methanol.

Yield: 4.92 g (95%).

J-Value: 66 ml/g.

IR Spectrum: See Example 2.

EXAMPLE 5

1.6 g (10.1 mmol) of 3,6-dimethylbenzo(1,2:4,5)dicyclobutene is reacted analogously to Example 4 with 3.18 g (10 mmol) of an isomer mixture of 1,6-bis-maleic acid imido-2,2,4- and -2,4,4-trimethylhexane.

Yield: 4.59 g (96%).

J-Value: 52 ml/g.

Softening point: 188°–193° C.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the production of a polyimide having recurring units of the formula

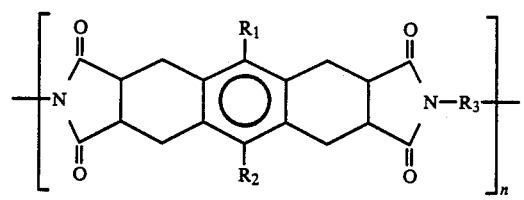

wherein $R_1$ and $R_2$ each independently is an alkyl group of 1–3 carbon atoms, hydrogen, or halogen;

$R_3$ is straight chain or branched alkylene group of 2–12 carbon atoms or

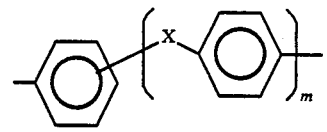

wherein m is 0 or 1,

X is $CH_2$, $C(CH_3)_2$, CO, O, S or $SO_2$, and n is an integer from 5 to 500, said process comprising reacting an N,N'-bis-maleic acid imide of the formula

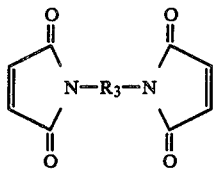

with a benzodicyclobutene of the formula

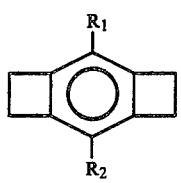

2. A process according to claim 1, wherein $R_3$ is

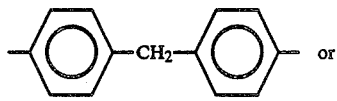 or

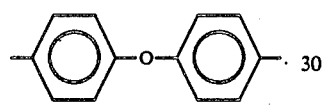

3. A process according to claim 1, wherein m is 0.
4. A process according to claim 1, wherein $R_1$ and $R_2$ are hydrogen.
5. A process according to claim 1, wherein $R_1$ and $R_2$ are methyl.
6. A process according to claim 1, wherein the molar ratio of imide to benzodicyclobutene is 0.8–1.2:1.
7. A process according to claim 1, wherein the reaction is conducted at a temperature of above 100° C.
8. A process according to claim 7, wherein the reaction is conducted at a temperature of 170°–250° C.
9. A process according to claim 1, wherein the reaction is conducted in an inert solvent.
10. A process according to claim 9, wherein the solvent is sulfolane, dimethyl sulfoxide, diphenylsulfone, chloronaphthalene, dichlorobenzene, nitrobenzene, diphenyl ether or mixtures thereof.
11. A process according to claim 10, wherein sulfolane is the solvent.
12. A process according to clam 9, wherein the concentration of monomer in solvent is about 1–30% by weight.
13. A process according to claim 1, wherein a phenolic or hydroquinone stabilizer is added to the reaction mixture of imide and benzodicyclobutene.
14. A process according to claim 1, wherein the molar ratio of imide to benzodicyclobutene, x, is $1.1 > x \geq 1$.
15. A process according to claim 1, wherein the molar ratio of imide to benzodicyclobutene, x, is $1.05 > x \geq 1$.
16. A process according to claim 13, wherein the ratio of imide to benzodicyclobutene is 0.8–1.2:1 mole.
17. A process according to claim 1, wherein the polymide has terminal groups of the formula

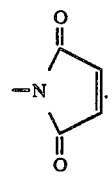

18. A process according to claim 1, wherein the polymide has at least one terminal group of the formula

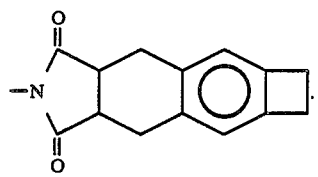

* * * * *